US008711090B2

(12) United States Patent  (10) Patent No.: US 8,711,090 B2
Kambe  (45) Date of Patent: Apr. 29, 2014

(54) CONTENT OUTPUT CONTROL DEVICE AND CONTENT OUTPUT CONTROL METHOD

(75) Inventor: Nobuhiro Kambe, Kanagawa (JP)

(73) Assignee: Panasonic Corporation, Osaka (JP)

( * ) Notice: Subject to any disclaimer, the term of this patent is extended or adjusted under 35 U.S.C. 154(b) by 145 days.

(21) Appl. No.: 13/125,849

(22) PCT Filed: Sep. 9, 2010

(86) PCT No.: PCT/JP2010/005525
§ 371 (c)(1),
(2), (4) Date: Apr. 25, 2011

(87) PCT Pub. No.: WO2011/064925
PCT Pub. Date: Jun. 3, 2011

(65) Prior Publication Data
US 2012/0235895 A1  Sep. 20, 2012

(30) Foreign Application Priority Data
Nov. 26, 2009  (JP) .................................. 2009-268626

(51) Int. Cl.
*G09G 5/00*  (2006.01)
(52) U.S. Cl.
USPC ............................ 345/156; 345/204; 348/731
(58) Field of Classification Search
None
See application file for complete search history.

(56) References Cited

U.S. PATENT DOCUMENTS

| 2007/0074255 | A1 | 3/2007 | Morioka |
| 2008/0216116 | A1* | 9/2008 | Pekonen et al. ................. 725/39 |
| 2009/0010324 | A1 | 1/2009 | Yamamoto |
| 2009/0279872 | A1* | 11/2009 | Umemoto et al. ............. 386/124 |

FOREIGN PATENT DOCUMENTS

| JP | 2000-253325 | 9/2000 |
| JP | 2005-191815 | 7/2005 |
| JP | 2007-96972 | 4/2007 |
| JP | 2007-135088 | 5/2007 |
| JP | 2008-153940 | 7/2008 |
| JP | 2008-187584 | 8/2008 |
| JP | 2009-17237 | 1/2009 |
| JP | 2009-520442 | 5/2009 |
| WO | 2007/078428 | 7/2007 |
| WO | 2009/072185 | 6/2009 |

OTHER PUBLICATIONS

International Search Report issued Nov. 22, 2010 in corresponding International Application No. PCT/JP2010/005525.

* cited by examiner

*Primary Examiner* — Jason Olson
(74) *Attorney, Agent, or Firm* — Wenderoth, Lind & Ponack, L.L.P.

(57) ABSTRACT

When a content output apparatus which can use a plurality of content providing devices switches from a first content providing device to a second content providing device and displays a content, a determination section predicts a start-up timing of starting to prepare for making a content of the second content providing device available on the basis of an operation input by a user, which is obtained by an input section. The switching section supplies power to a second device processing section on the basis of the predicted start-up timing.

11 Claims, 10 Drawing Sheets

CONTENT OUTPUT CONTROL DEVICE AND CONTENT OUTPUT CONTROL METHOD

TECHNICAL FIELD

The present invention relates to a content output apparatus which obtains contents from a plurality of content providing devices such as a broadcasting, a network, a memory card, and the like and outputs the obtained contents. The present invention particularly relates to a power saving technology in a content output control device which switches between content providing devices without delay.

BACKGROUND ART

Recently, televisions which not only receive and display broadcasts but also reproduce and display video contents stored in a memory card and video contents on the network have appeared on the market. Similarly, among mobile devices such as mobile phones, there are products which can display contents obtained from various content providing devices.

In addition, content providing devices have increased in type and number. Examples of such content providing devices include: broadcast systems such as the terrestrial digital broadcast, satellite broadcasting, cable television, and the like; storage media such as hard disks, memory cards, and the like; content providing devices connected to network including content providing sites; and content providing devices connected with multimedia interfaces.

In order to interact with such a variety of content providing devices, a conventional content output apparatus has applications installed therein specific to the respective content providing devices, and the user activates the respective applications. Each of the applications adopts a method of operation, such as content selection, dedicated to the corresponding content providing device. The user operates the respective applications to determine any content from among a large number of contents contained in the content providing devices.

It is troublesome for a user to operate a different application for each of the respective content providing devices. For this reason, Patent Literature 1, for example, discloses a content output apparatus which can unify these applications into a single application, and operate all of the content providing devices in accordance with the respective methods of operation by this single application. The content output apparatus; however, has the following problems.

In the content output apparatus, in order for a user to find a content he/she is interested in from among various contents, the user performs zapping, that is, the user scans through channels by frequently switching between channels in a short period of time. However, such a device that recognizes and utilizes these content providing devices is required to perform various processes such as initializing a corresponding device driver, obtaining data, decoding data, and the like, resulting in a long time for switching between channels.

In addition, as a result of such as recent increasing concern among users about the global environmental issues, it has become important for the content output apparatus to operate with low power consumption. The user performs zapping by switching between contents contained in the different content providing devices by using an integrated interface described above. In this case, delay in switching between the content providing devices can be reduced if the content providing devices are made available beforehand. However, in order to make all of the content providing devices available, power needs to be supplied to all of the devices that use the content providing devices regardless of whether a content which the user desires is contained, resulting in wasted power consumption of the content output apparatus. In contrast, if power is supplied only to the content providing device which is providing a content being currently viewed, power to be consumed by the content output apparatus can be saved. However, time is taken for the above described process during switching between the content providing devices, which leads to delay in switching between the content providing devices. Accordingly, even when the user views contents while performing zapping by switching between the content providing devices, it is desired to switch between the content providing devices without delay and simultaneously save power by eliminating power supply to unnecessary devices.

As one of technologies for solving these problems, there has been a method disclosed by Patent Literature 2. Patent Literature 2 discloses a display device for digital television broadcasting which can switch without delay between channels and save power when zapping is performed by continuously switching between the channels in ascending order or in descending order. The display device for digital television broadcasting performs more processes, when compared with analog broadcasting, such as obtaining data, decoding data, and the like, resulting in delay between a time channel is switched from one to another and the time an image is displayed. A display device of Patent Literature 2 obtains the channel number currently selected and whether the user is performing channel operation in ascending order or in descending order. Subsequently, the display device predicts a channel to be displayed next before the channel is switched to another. Then, the display device starts up a main process system for displaying the corresponding channel and a sub-process system for preparing the predicted channel, thereby switching to the sub-process system at a time when the channel is switched. Accordingly, the display device eliminates delay when the user views channels while performing zapping. Further, the display device stops the operation of the sub-process system when the channel of the main process system is continuously viewed. Accordingly, the display device can reduce power consumption.

CITATION LIST

Patent Literature

[Patent Literature 1] Japanese Laid-Open Patent Publication No. 2008-187584
[Patent Literature 2] Japanese Laid-Open Patent Publication No. 2009-17237

SUMMARY OF THE INVENTION

Problems to be Solved by the Invention

However, the above conventional content output method has the following problems for application to a content output apparatus which is compatible with various content providing devices.

In Patent Literature 2, because a maximum value of delay time is limited due to the communication standard of digital television broadcasting, a delay time does not exceed a viewing time of one channel when a user views channels while performing zapping. However, when the conventional content output method is applied to the various content providing devices, the delay time may be longer when compared with the digital television broadcasting of Patent Literature 2. For example, an access to a content providing site via a network may require some time depending on the network status. In this case, predicting an immediately following channel as described in Patent Literature 2 is not enough. It is required to predict a channel to be switched a few channels later, and to start to prepare for making a content contained in the content providing device available ahead of time.

A delay time, which is a time required until a content becomes available, varies depending on each content providing device. For this reason, in order to save power, it is not preferable to start to prepare for making the content contained in the content providing device available at a timing in accordance with a content providing device that has the longest delay time. Accordingly, the timing needs to be set appropriately in accordance with a delay time of each content providing device.

The present invention has been made to solve the above problems, and its objective is to provide a content output control device which can eliminate a delay time and save power when a user views contents while performing zapping over various content providing devices.

Solution to the Problems

In order to achieve the above objective, a content output control device of the present invention controls a content output apparatus which obtains, from a plurality of content providing devices some of which are available via a network, contents through device processing sections compatible with the respective content providing devices; and outputs the obtained contents and includes: a switching section for, when a channel switching operation is inputted by a user, switching between channels on the basis of the channel switching operation and determining whether a zapping operation is currently performed; a channel management section for managing, as channel arrangement, arrangement in which channels provided by the plurality of the content providing devices are arranged in order of switching by the channel switching operation; and a determination section for, when the switching section determines that the zapping operation is currently performed, calculating, on the basis of the channel arrangement, an estimated time period until a channel for displaying a content being currently viewed is switched to an initial channel of a different content providing device from a content providing device providing the content being currently viewed; and determining that a start-up timing has come when the estimated time period falls below a predetermined value. Then, when the determination section determines that the start-up timing has come, the switching section starts up a device processing section connected to the different content providing device.

Further, in a case where the device processing section can control power supply to the content providing devices, when the determination section determines that the start-up timing has come, the content output control device according to the present invention may cause the device processing section connected to the different content providing device to start up the different content providing device.

Further, each of the channels may be a group of contents to which an order of output is preassigned.

Further, the content output control device according to the present invention may further include an organization section for, when a new content providing device is connected to the content output apparatus, if a content providing device being in connection performs control in the same manner as the new content providing device, rearranging the channel arrangement such that channels of the new content providing device are arranged adjacent to channels of the content providing device being in connection.

Further, the determination section may retain a starting-up time from a time when a device processing section connected to the plurality of the content providing devices is powered on to a time when contents of the plurality of the content providing devices become available; and determine the predetermined value to be the starting-up time.

Further, the determination section may retain a first starting-up time from a time when a device processing section connected to the plurality of the content providing devices is powered on to a time when the plurality of the content providing devices become accessible and a second starting-up time from a time when the plurality of the content providing devices are powered on to a time when contents of the plurality of the content providing devices become available; and determine, when a process of starting up the device processing section is performed in parallel with a process of starting up the content providing devices, one of the first starting-up time and the second starting-up time, whichever is longer, to be the predetermined value.

Alternatively, the determination section may retain a first starting-up time from a time when a device processing section connected to the plurality of the content providing devices is powered on to a time when the plurality of the content providing devices become accessible and a second starting-up time from a time when the plurality of the content providing devices are powered on to a time when contents of the plurality of the content providing devices become available; and determine a sum of the first starting-up time and the second starting-up time to be the predetermined value, when a process of starting up the content providing devices can be performed after performing a process of starting up the device processing section.

Further, the determination section may calculate the estimated time period on the basis of: the number of channels from a channel being currently viewed to the initial channel of the different content providing device; or both of the number of the channels and a time taken for switching from one channel to another in the channel switching operation.

Further, the switching section may, when the device processing section connected to the different content providing device is started up as a result of a switching process performed by the switching section, measure a time elapsed from a time when use of a content providing device before the switching process is terminated; and, when the elapsed time exceeds a predetermined threshold, terminate power supply to a device processing section connected to the content providing device before the switching process.

Further, the switching section may, when the device processing section connected to the different content providing device is started up as a result of a switching process performed by the switching section, measure an elapsed time from a time when use of a content providing device before the switching process is terminated; and, when the elapsed time exceeds a predetermined threshold, cause a device processing section connected to the content providing device before the switching process to terminate power supply to the content providing device before the switching process.

In order to achieve the above objective, a content output control method according to the present invention for controlling a content output apparatus which obtains, from a plurality of content providing devices some of which are available via a network, contents through device processing sections compatible with the respective content providing devices; and outputs the obtained contents, the content output control method including: a switching step of, when a channel switching operation is inputted by a user, switching between channels on the basis of the channel switching operation and determining whether a zapping operation is currently performed; a determining step of, when it is determined that the zapping operation is currently performed in the switching step, calculating, on the basis of channel arrangement in which channels provided by the plurality of the content providing devices are arranged in order of switching by the channel switching operation, an estimated time period until a channel for displaying a content being currently viewed is switched to an initial channel of a different content providing device from a content providing device providing the content being currently viewed; and determining that a start-up timing has come when the estimated time period falls below a predetermined value; and a starting up step of, when it is determined that the start-up timing has come in the determining step, starting up a device processing section connected to the different content providing device.

Advantageous Effects of the Invention

With the above configuration, the present invention can realize power saving without delay even when a user views contents while performing zapping over a plurality of content providing devices.

DESCRIPTION OF EMBODIMENTS

First Embodiment

Figure 1:
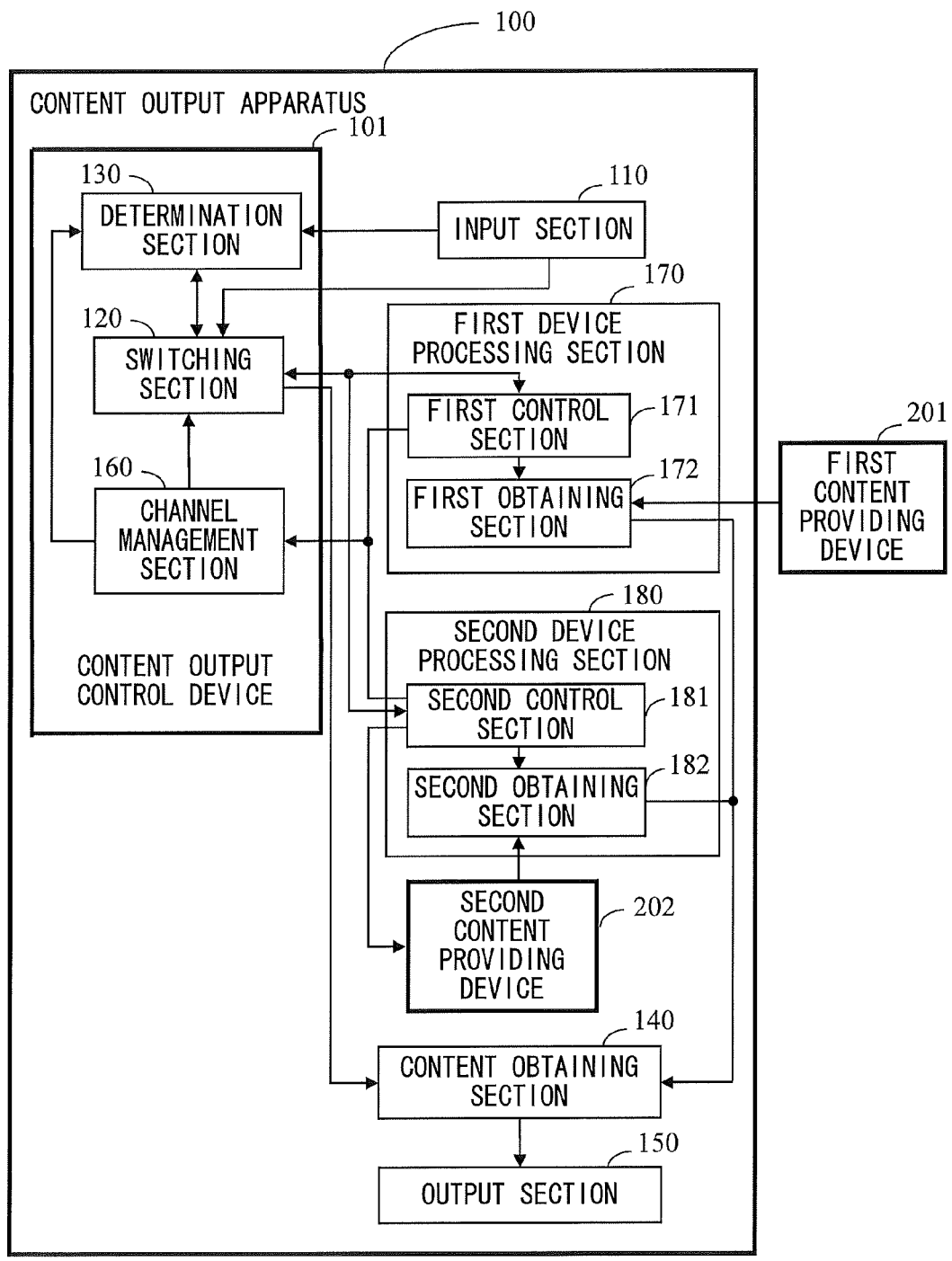
FIG. 1 shows a configuration of a content output apparatus including a content output control device according a first embodiment of the present invention.

FIG. 1 shows a configuration of a content output apparatus including a content output control device according a first embodiment of the present invention. A content output apparatus 100 according to the present embodiment is a television receiver for viewing contents contained in a first content providing device 201 and a second content providing device 202.

The first content providing device 201 is a transmission device which integrates broadcast waves of a plurality of broadcasting stations, that is, broadcast channels; and transmits the integrated broadcast channels. The first content providing device 201 transmits a plurality of channels by transmitting a group of contents provided by a single content provider (a broadcasting station) as one channel.

The content output apparatus 100 includes a content output control device 101, an input section 110, a content obtaining section 140, an output section 150, a first device processing section 170, a second device processing section 180, and the second content providing device 202. The content output control device 101 includes a switching section 120, a determination section 130, and a channel management section 160. The first device processing section 170 includes a first control section 171 and a first obtaining section 172. The second device processing section 180 includes a second control section 181 and a second obtaining section 182.

The second content providing device 202 is an internal hard disk. The second content providing device 202 can categorize contents contained therein into a plurality of groups on the basis of content attribute information indicating such as categories; and manage the plurality of groups. The second content providing device 202 manages the plurality of groups by using playlists in each of which a plurality of contents are contained in the order of output. When there are the playlists, the playlists can be regarded as respective channels, and the playlists can be switched and viewed in the same way as the broadcast channels. When there is no playlist, a list of contents contained in the second content providing device 202 can be regarded as one channel, or a group categorized based on the content attribute information can be regarded as one channel. Accordingly, by regarding each of the groups of contents contained in the second content providing device 202 categorized based on the content attribute information as a channel, the groups of contents can be handled in the same way as the broadcast channels.

The input section 110 includes operation buttons such as a key button, up/down/left/right buttons, and the like, and a pressure-sensitive touch panel. The input section 110 receives, from the user, an operation such as switching contents and switching devices. Alternatively, the input section 110 may include two components, that is, a remote controller and a controller receiving section. In this case, the remote controller receives an operation from the user and transmits a signal regarding the operation by the user to the controller receiving section, while the controller receiving section receives the signal and receives the operation from the user such as switching contents and switching devices.

The switching section 120 is a switch for switching between the first device processing section 170 and the second device processing section 180. The switching section 120 performs a switching process on the basis of an operation input obtained by the input section 110 and channel arrangement managed by the channel management section 160. In a channel where a content operation such as fast-forwarding and skipping can be performed, upon receipt of a content operation request from the input section 110, the switching section 120 transmits the content operation request to a device processing section for a content providing device providing a content currently viewed. The operation of the switching section 120 will be described later in detail.

In the first device processing section 170 which is a television broadcasting tuner, the first control section 171 corresponds to a device driver. The first control section 171 controls power supply and performs an initialization process of the entire first device processing section 170, and the first control section 171 manages and controls channels obtained from the first content providing device 201. The first obtaining section 172 receives a broadcast wave from the first content providing device 201 on the basis of channel control by the first control section 171, and decodes the broadcast wave into a content which the content output apparatus 100 can output.

In the second device processing section 180 which is a file system, the second control section 181 corresponds to a device driver. The second control section 181 controls power supply to the second device processing section 180, and controls contents obtained from the second content providing device 202, or controls groups regarded as channels which are categorized based on the content attribute information. In addition, the second control section 181 controls power supply to the second content providing device 202. The second obtaining section 182 obtains a content from the second content providing device 202, and converts the content into a content which the content output apparatus 100 can output according to need.

The content obtaining section 140 obtains a content from one of the first obtaining section 172 and the second obtaining section 182 on the basis of control of the switching section 120, and outputs the obtained content to the output section 150.

The output section 150 includes a display for displaying a content and outputs a content obtained from the content obtaining section 140.

In response to an operation from the user which is inputted to the input section 110, the determination section 130 predicts a time at which a content contained in the first content providing device 201 is switched to a content contained in the second content providing device 202 on the basis of a content and a timing of the operation. Alternatively, the determination section 130 predicts a time at which the content contained in the second content providing device 202 is switched to the content contained in the first content providing device 201. Then, on the basis of the prediction, the determination section 130 requests the switching section 120 to switch the devices. The operation of the determination section 130 will be described later in detail.

The channel management section 160 recognizes the first device processing section 170 and the second device processing section 180 at the time of an operation start of the content output apparatus 100. Then, the channel management section 160 manages: arrangement of the content providing devices connected to each of the device processing sections; channel arrangement of groups each of which is regarded as a channel consisting of contents contained in each of the content providing devices; and arrangement of the contents contained in each of the channels. The operation of the channel management section 160 will be described later in detail.

The content output control device 101 including the switching section 120, a prediction section 130, and the channel management section 160 is configured with a CPU and the like, and the content output control device 101 performs control processes of the whole apparatus such as performing a content output process. The CPU includes a ROM, a RAM, an EEPROM, and the like, and the CPU stores therein, in addition to a program and communication control data, various data such as content data, channel arrangement, and the like.

In the following, the operation of the content output apparatus 100 having the above-described configuration will be described with reference to the drawings.

Figure 2:
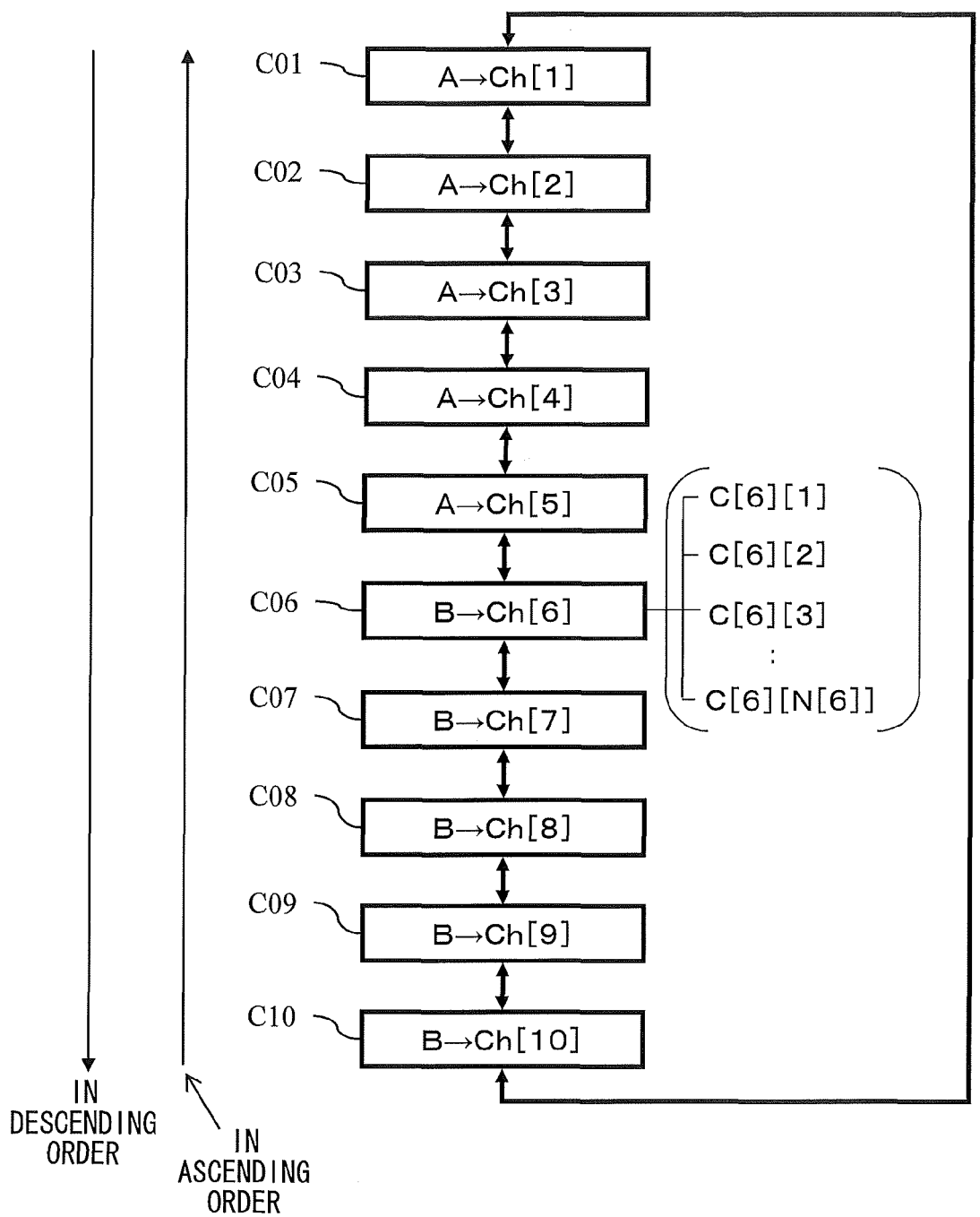
FIG. 2 is a schematic diagram of channel arrangement according to the first embodiment of the present invention.

FIG. 2 is a schematic diagram of arrangement of channels contained in a plurality of content providing devices, the arrangement being integrated for the sake of an operation of switching contents in the content output apparatus 100. Here, the first content providing device 201 and the second content providing device 202 are denoted by "A" and "B," respectively. "A" contains five channels which are Ch[1], Ch[2], Ch[3], Ch[4], and Ch[5] while "B" contains five channels which are Ch[6], Ch[7], Ch[8], Ch[9], and Ch[10].

The channel management section 160 manages channel arrangements {A, B} of the content providing devices 201 and 202. Further, the channel management section 160 manages, as channel arrangement, {A→Ch[1], A→Ch[2], A→Ch[3], A→Ch[4], A→Ch[5], B→Ch[6], B→Ch[7], B→Ch[8], B→Ch[9], B→Ch[10]}. C01 to C10 in FIG. 2 are reference numerals assigned to the channels, respectively.

The channels each contain one or more contents. For example, contents contained in channel Ch[i] (i=1 . . . 10) are, in the order of the contents to be outputted to the output section 150, C[i][j] (j=1 to N[i] (N[i] is a total number of contents contained in channel Ch[i])). In this case, the channel management section 160 further manages, as content arrangement:
{A→Ch[1]→C[1][1], . . . , A→Ch[1]→C[1][N[1]], . . . , B→Ch[10]→C[10][1], . . . , B→Ch[10]→C[10][N[10]]}.
In FIG. 2, contents of channel C06 are provided in parentheses for ease of description.

Arrangement of channels Ch[1] to Ch[5], which are broadcast channels, are managed such that each channel contains only one content distributed from a broadcasting station.

Here, it is assumed, when the user views channels while performing zapping, that the user performs a channel switching operation only either in ascending order or in descending order as shown in FIG. 2. Further, a single channel switching operation by the user switches from a channel to a next channel either in ascending order or in descending order in a direction indicated by an arrow. A switching operation in ascending order is performed by, for example, the up button included in the input section 110 being pressed by the user. A switching operation in descending order is performed by, for example, the down button included in the input section 110 being pressed by the user.

In FIG. 2, it is assumed that a channel being currently viewed is channel C02 that is the second channel of "A." In this situation, if the user performs a single channel switching operation in ascending order, the channel being currently viewed is switched to channel C01. Meanwhile, if the user performs a single channel switching operation in descending order, the channel being currently viewed is switched to channel C03.

"A" obtains contents from a content providing device different from a content providing device from which "B" obtains contents. In the example of FIG. 2, the channel being currently viewed is switched from channel C05 to channel C06, and the content providing device from which contents are obtained is switched from the first content providing device 201 to the second content providing device 202 accordingly.

Figure 3:
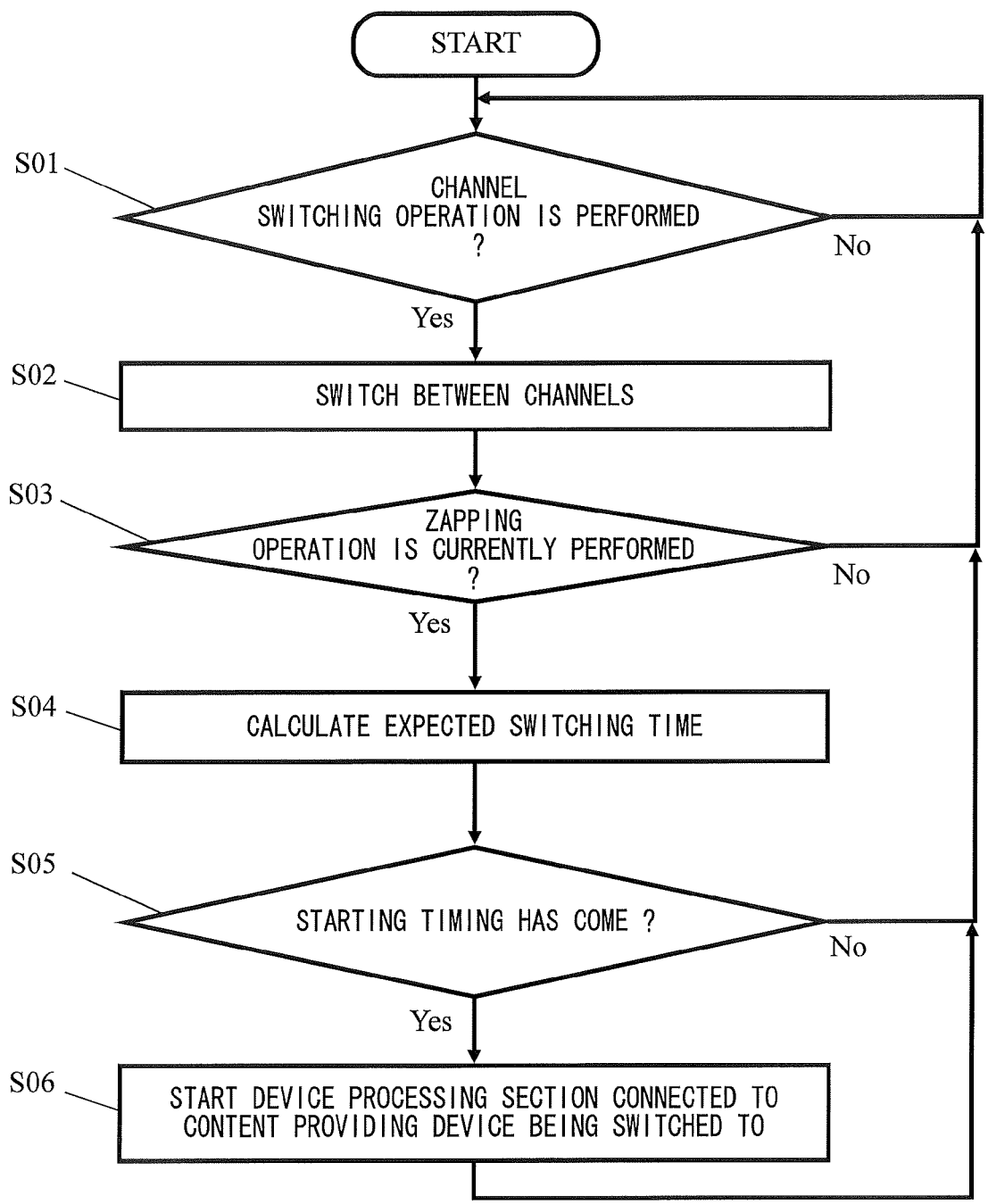
FIG. 3 is a flow chart showing operations to be performed when a user performs a zapping operation in the first embodiment of the present invention.

FIG. 3 is a flow chart showing operations of the content output apparatus 100 performed when the user performs a zapping operation in the first embodiment. In the following, the operations of the content output apparatus 100 will be described by using FIGS. 2 and 3.

First, the input section 110 determines whether the user has performed a channel switching operation (step S01). When the input section 110 determines that the user has not performed a channel switching operation (NO in step S01), the processing returns to step S01.

When the input section 110 determines that the user has performed a channel switching operation (YES in step S01), the switching section 120 switches between channels on the basis of the channel switching operation (step S02). Detail of the channel switching process varies depending on whether the channel being currently viewed has been switched to a broadcast channel or a channel other than broadcast channels.

When the channel being currently viewed is switched to a broadcast channel, the switching section 120 switches a content being displayed to a content of the channel after switching. For example, in FIG. 2, the user presses the down button while the user is viewing the channel C02, thereby performing a channel switching operation in descending order. Accordingly, the switching section 120 switches a channel being viewed from channel C02 being currently viewed to channel C03. In this case, the first obtaining section 172 obtains a content of channel C03 which is a channel after switching, and the output section 150 displays the content thereon.

When a channel after switching is not a broadcast channel, the switching section 120 switches a content being displayed to an initial content of the channel. For example, in FIG. 2, when the channel being viewed after switching is C06, the switching section 120 switches a content being displayed to a content of C[6][1] of channel C06.

When a channel being viewed after switching is not a broadcast channel and a certain content of the channel has not been viewed through to the end when the user most recently viewed the channel, the switching section 120 may switch a content being displayed to the content which has not been viewed through to the end. For example, in FIG. 2, in channel C06, the switching section 120 switches a content being displayed to a content of C[6][2] of channel C06 in the following case. That is, a case where the channel is switched to C06 when the content which the user most recently viewed is C[6][2] and the user has not viewed the content of C[6][2] through to the end.

Alternatively, when the channel after switching is not a broadcast channel and a certain content of the channel has been viewed through to the end when the user most recently viewed the channel, the switching section 120 may switch to a content immediately following the content having been viewed through to the end. For example, in FIG. 2, in channel C06, the switching section 120 switches to a content of C[6][3] of channel C06 in the following case. That is, a case where a channel being viewed is switched to C06 when the content which the user most recently viewed is C[6][2] and the user has viewed the content of C[6][2] through to the end.

Next, the switching section 120 determines whether the user is currently performing a zapping operation (step S03). A method for determining whether the user is currently performing a zapping operation will be described later in detail. When the switching section 120 determines that the user is not currently performing a zapping operation (NO in step S03), the processing returns to step S01.

When the switching section 120 determines that the user is currently performing a zapping operation (YES in step S03), the determination section 130 obtains a channel switching operation inputted to the input section 110. Then, the determination section 130 obtains from the switching section 120 following (1) to (3):

(1) a starting-up time of the first device processing section 170 obtained from the first control section 171 by the switching section 120;
(2) a starting-up time of the second device processing section 180 obtained from the second control section 181; and
(3) a position of a channel being currently viewed.

Further, the determination section 130 obtains channel arrangement from the channel management section 160. Then, the determination section 130 calculates an expected switching time of the content providing devices through the following process (step S04).

First, on the basis of the channel arrangement and whether the channel switching operation is performed in ascending order or in descending order, the determination section 130 specifies an initial channel of the content providing device being switched to next. Then, the determination section 130 obtains the number of channels N from a channel being currently viewed to the initial channel of the content providing device to be switched to next. For example, when the channel being currently viewed is channel C03 and a channel switching operation is performed in descending order, the determination section 130 specifies the initial channel of the content providing device to be switched to next as channel C06 and obtains 3 for the value of N.

Next, the determination section 130 calculates a time U which is a time taken for a single channel switching operation, by dividing a time period from a time when the user starts a channel switching operation to a time when the channel is switched to the channel being currently viewed by the number of channels having been switched. For example, when a channel which the user is viewing when the user starts a channel switching operation in descending order is channel C01; and the channel which is currently being viewed is channel C03, the number of channels having been switched is 2. In this case, when a time taken for switching from channel C01 to channel C03 is $\Delta T$, the time U is $\Delta T/2$. Accordingly, when the time U and the number of channels N are obtained, the determination section 130 calculates an expected switching time T by $U \times N$.

Next, the determination section 130 determines whether a start-up timing has come on the basis of a starting-up time W of a device processing section which is connected to the content providing device being switched to (step S05). A determination of whether the start-up timing has come is made on the basis of whether the expected switching time T is equal to or shorter than the starting-up time W.

When a system is configured with a simple structure, the time U taken for the single channel switching operation and the starting-up time W of the device processing section may be set to a common predetermined value. Further, the determination section 130 may not predict a start-up timing and may determine that the start-up timing has come when the rest of the number of channels N falls below a predetermined threshold. Alternatively, the switching section 120 may retain a history of channel operations with corresponding times and the determination section 130 may understand a pattern of switching, thereby predicting the expected switching time T. When the determination section 130 does not determine that the start-up timing has come (NO in step S05), the processing returns to step S01.

When the determination section 130 determines that the start-up timing has come (YES in step S05), the switching section 120 starts up the device controlling section connected to the content providing device being switched to (step S06). In the above example, the switching section 120 starts up the second device processing section 180 which is connected to "B" that is the second content providing device 202. Then, the processing returns again to step S01 and the input section 110 waits to receive a channel operation.

Next, with reference to FIG. 4, operations of the content output apparatus 100 to be performed after the device processing section connected to the content providing device being switched to is started up will be described in detail. First, the switching section 120 determines whether the channel has been switched to a channel of the content providing device being switched to (step S11). When the switching section 120 determines that the channel has not been switched to the channel of the content providing device to be switched to (NO in step S11), the switching section 120 waits until the channel is switched to the channel of the content providing device to be switched to (step S11).

Then, when the switching section 120 determines that the channel has been switched to the channel of the content providing device being switched to (YES in step S11), the determination section 130 starts to measure a time elapsed from a time when the channel is switched to the channel of the content providing device being switched to (step S12). Then, the determination section 130 determines whether the elapsed time has exceeded a predetermined threshold (step S13). When the determination section 130 determines that the elapsed time has not exceeded the predetermined threshold (NO in step S13), the determination section 130 waits until the elapsed time exceeds the predetermined threshold (step S13).

Then, when the determination section 130 determines that the elapsed time has exceeded the predetermined threshold (YES in step S13), the switching section 120 causes a control section of the device processing section connected to the content providing device not in use to terminate power supply to the device processing section (step S14).

For example, in FIG. 2, the user performs, after viewing channel C02, a zapping operation in descending order. Then, after the channel is switched to C06, the user views C06 continuously for a time period exceeding the above-described threshold. In this case, the switching section 120 causes the first control section 171 to terminate power supply to the first device processing section 170.

Next, with reference to FIGS. 5 and 6, a method for determining whether the user is currently performing a zapping operation in step 03 will be described in detail.

Figure 5:
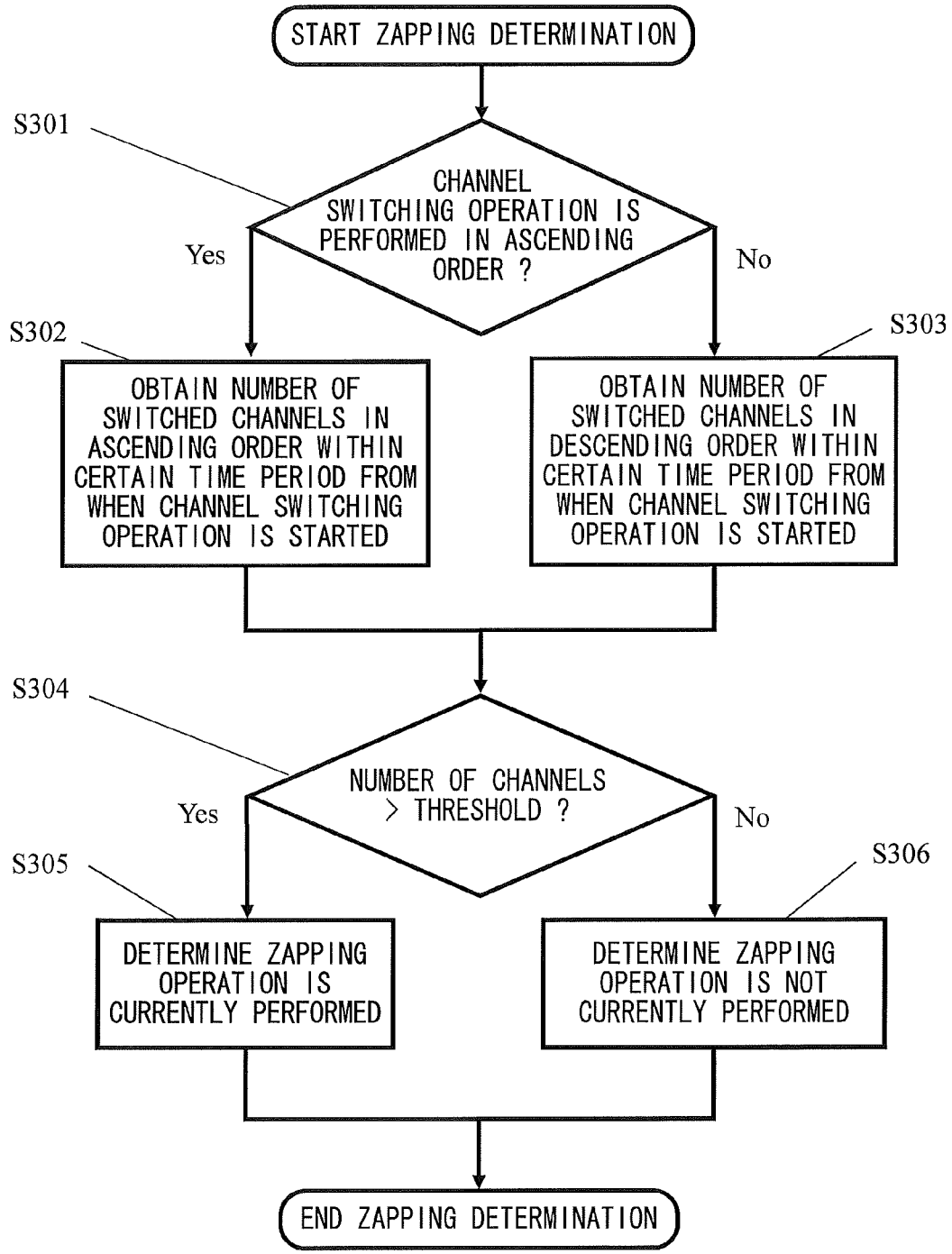
FIG. 5 is a flow chart showing a zapping determination process to be performed when a signal regarding a switching operation by the user is continuously received by an input section 110.

FIG. 5 is a flow chart showing processing concerning step S03 performed by the switching section 120 when a signal regarding a channel switching operation by the user is continuously received by the input section 110. Here, a case where a signal regarding the channel switching operation by the user is continuously received by the input section 110 is one of the following four cases:

(1) a case where the user repeatedly presses an operation button;
(2) a case where, in an embodiment in which the switching section 120 switches the channel to a next channel either in ascending order or in descending order depending on a direction of a single light stroking motion (flick motion) performed by the user with a finger on a touch panel, the user repeatedly performs the flick motion;
(3) a case where a long press of an operation button by the user causes a signal regarding the channel switching operation to be transmitted to the input section 110 each time a certain time elapses; or
(4) a case where a long press of an operation button by the user causes an identical signal regarding the switching operation to be continuously transmitted to the input section 110, and the input section 110 determines whether to perform the switching operation each time a certain time elapses depending on whether the signal has been received.

In the processing, first, the switching section 120 determines whether the channel switching operation is performed in ascending order as shown in FIG. 2 (step S301).

When the switching section 120 determines that a channel switching operation is performed in ascending order as shown in FIG. 2 (YES in step S301), the switching section 120 obtains the number of channels switched in ascending order within a certain time period from a time when the channel switching operation is started (step S302).

When the switching section 120 determines that the channel switching operation is performed in descending order as shown in FIG. 2 (NO in step S301), the switching section 120 obtains the number of channels having been switched in descending order within the certain time period from a time when the channel switching operation is started (step S303).

Next, the switching section 120 determines whether the number of switched channels obtained in step S302 or in step S303 is greater than a predetermined threshold (step S304). When the switching section 120 determines that the number of switched channels is greater than the predetermined threshold (YES in step S304), the switching section 120 determines that a zapping operation is currently performed (step S305). On the other hand, when the switching section 120 determines that the number of switched channels is equal to or less than the predetermined threshold (NO in step S304), the switching section 120 determines that the zapping operation is not currently performed (step S306).

Figure 6:
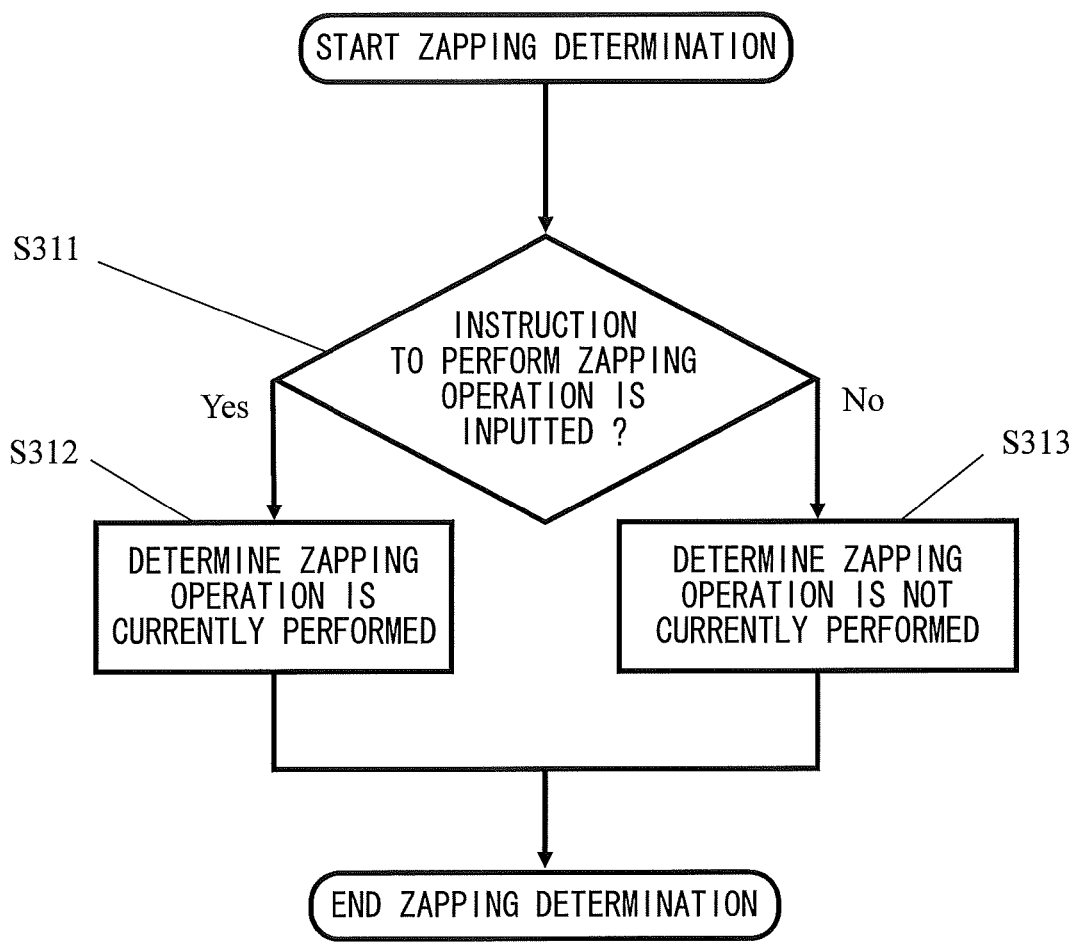
FIG. 6 is a flow chart showing a zapping determination process performed in a case where the input section 110 of a content output apparatus 100 can input an instruction to perform a zapping operation.

FIG. 6 is a flow chart showing processing performed by the switching section 120 in step S03 of FIG. 3 in a case where the input section 110 of the content output apparatus 100 can input an instruction to perform a zapping operation. As a method for inputting an instruction to perform the zapping operation, there is a method in which, for example, a scan button (a button which starts a zapping process when being pressed) or the like is pressed. In addition, there is a method in which a function is used for performing a zapping operation during a time period from a time when the user performs a light stroking motion (flick motion) with his/her finger on a touch panel to a time when the user touches on the touch panel next time.

In this process, first, the switching section 120 determines whether the user has inputted an instruction to perform a zapping operation (step S311). When the switching section 120 determines that the user has inputted an instruction to perform the zapping operation (YES in step S311), the switching section 120 determines that a zapping operation is currently performed (step S312). On the other hand, when the switching section 120 determines that the user has not inputted an instruction to perform the zapping operation (NO in step S311), the switching section 120 determines that the zapping operation is not currently performed (step S313).

Figure 7:
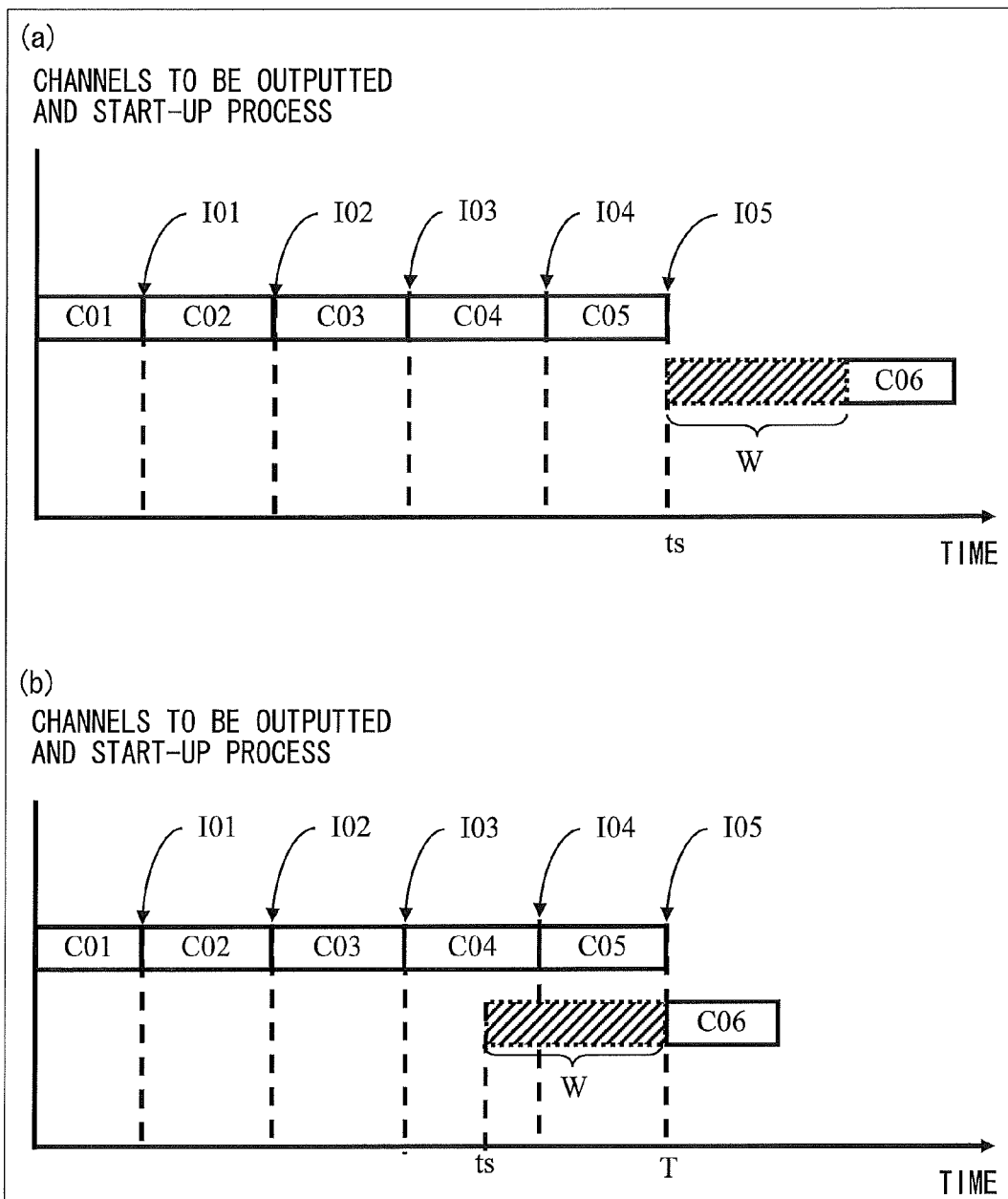
FIG. 7 is a schematic diagram of times taken for channel switching in the first embodiment of the present invention.

Next, with reference to FIG. 7, an effect of the first embodiment will be described in detail. FIG. 7 schematically shows channels being viewed and operation inputs performed by the user; and start-ups of device processing sections connected to respective content providing devices. (a) of FIG. 7 is a schematic diagram of a case of a conventional method. In (a) of FIG. 7, a horizontal axis represents time while vertical axes at different positions represent channels outputted by respective content providing devices in chronological order of output. Channels are switched by operation inputs I01, I02, I03, I04, and I05. Especially, the content providing devices are switched by I05. However, a start-up process is performed at the time of I05, which results in delay of the start-up of the second device processing section 182. (b) of FIG. 7 is a schematic diagram of a case of the method of the present embodiment. In the first embodiment, an expected switching time T is calculated, and on the basis of the expected switching time T and a starting-up time of a device processing section, a start-up timing ts of the device processing section is calculated, whereby making the device processing section available.

In the first embodiment, as shown in (b) of FIG. 7, the start-up timing ts can be optimally set, thereby realizing power saving and eliminating delay when a user views contents while zapping by switching between content providing devices.

Further, in the first embodiment, after switching the content providing devices, power supply to a device processing section connected to the content providing device before switching is terminated when channels of the content providing device before switching is not viewed for a certain time period or longer. Accordingly, in the first embodiment, further power saving can be realized.

It is noted that also in a case where the channel switching operation is performed both in ascending order and in descending order within a certain time period after starting a channel switching operation; and the number of times of the channel switching operations within the certain time period is great, it is considered that a user is viewing channels while performing zapping. In this case, in the zapping determination process of FIG. 5, the determination process of step S301 is omitted and the channel switching operation is started. Then, the number of switched channels both in ascending order and in descending order in the certain time period is obtained. Next, in step S304, the switching section 120 may determine whether a zapping operation is currently performed depending on whether the number of switched channels exceeds a predetermined threshold.

Figure 4:
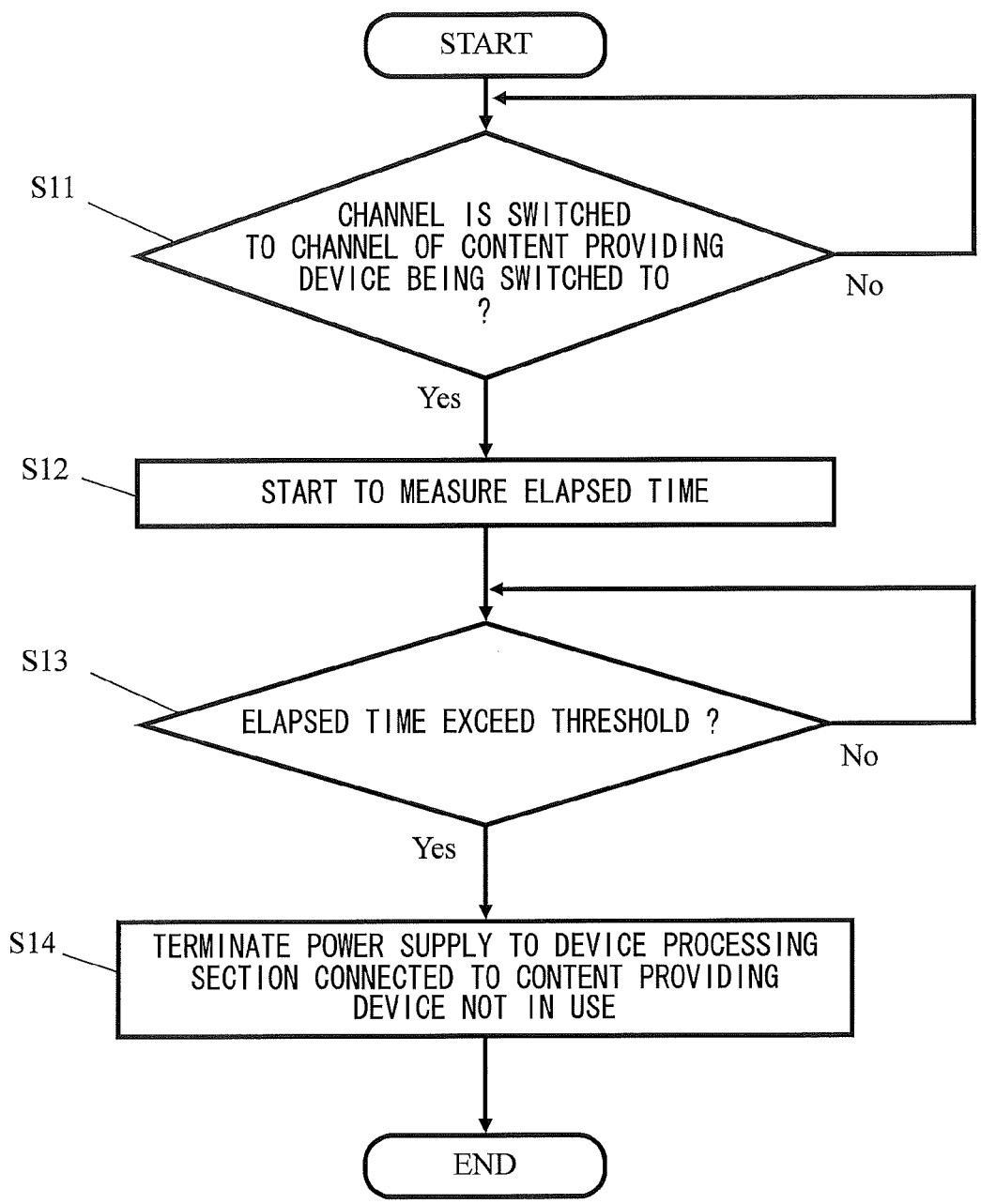
FIG. 4 is a flow chart showing operations to be performed after a device processing section connected to a content providing device to be switched is started up by the zapping operation by the user in the first embodiment of the present invention.

Further, in order to make a determination in step S13 of FIG. 4, a timing of starting to measure an elapsed time may be, other than a timing in step S12 of FIG. 4, a start-up timing in step S05 of FIG. 3.

Further, when the switching section 120 switches device processing sections, the first control section 171 and the second control section 181 may load/unload to/from an execution memory a program or a library used specially for, for example, decoding. That is, the first control section 171 and the second control section 181 load a library or the like used for switching to an execution memory, and unload the library or the like used for switching from the execution memory. Accordingly, more free space is created in the execution memory, which may result in higher processing of the content output apparatus. The higher processing can decrease a time for starting up the device processing section connected to the content providing device being switched to next. Therefore, the content output apparatus can delay a start-up timing of the device processing section, and thus power consumption can be reduced.

Further, in the first embodiment, a case is described in which the content output apparatus terminates power supply to the device processing section connected to the content providing device not in use. However, in the first embodiment, the content output apparatus may, instead of completely terminating power supply, cause the device processing section to be in a standby state in which less power is consumed than in a normal state. In this case, although not as effective for power saving as the first embodiment, the content output apparatus can shorten the time for starting up the device processing section. Thus, during the user views contents while performing zapping, the content output apparatus can accurately predict a start-up timing of the device processing section.

Further, when the control section of the device processing section can control power supply to the content providing device, in step S06 of FIG. 3, the content output apparatus may cause the control section of the device processing section having been started up by the switching section 120 to start up the content providing device. In this case, when a process of starting up the device processing section can be performed in parallel with a process of starting up the content providing device, the starting-up time W in step S05 of FIG. 3 is one of a time for starting up the device processing section and a time for starting up the content providing device, whichever is longer. Further, when the process of starting up the content providing device can be performed after the process of starting up the device processing section, the starting-up time W is a sum of the time for starting up the device processing section and the time for starting up the content providing device. In addition, in step S14 of FIG. 4, the switching section 120 may cause the control section of the device processing section connected to the content providing device not in use to terminate power supply also to the content providing device. Accordingly, in the first embodiment, power supply not only to the device processing section but also to the content providing device can be optimized, thereby realizing further power saving of the content output apparatus.

Further, in the first embodiment, an example is described in which the first content providing device 201 is provided outside the content output apparatus 100 while the second content providing device 202 is provided inside the content output apparatus 100; however, all of the content providing devices may be provided inside the content output apparatus 100 or outside the content output apparatus 100.

Further, in the first embodiment, the description has been made by using a television receiver; however, in addition to a mobile phone, or a personal computer, the present embodiment may be generally applied to devices which can use a plurality of content providing devices by switching among the plurality of the content providing devices.

Further, in the present embodiment, the description has been made by using a content output apparatus which handles video contents; however, a format of content is not limited to that of a multimedia content (music, image, text, or the like) which is contained in a plurality of content providing devices. Accordingly, the present embodiment may be applied to a music player, a car navigation system, and the like.

Here, a case is described in which two types of content providing devices, that is, the first content providing device 201 and the second content providing device 202 are provided; however, the number of content providing devices is not limited to two. The present embodiment are applicable to various content providing devices such as a content providing device which is a broadcast system such as the terrestrial digital broadcast, satellite broadcasting, or cable television; a content providing device of a storage media such as a hard disk, a memory card, an optical disc, or the like; a content providing device connected via a USB (Universal Serial Bus), a content providing device connected via a wired or wireless LAN (Local Area Network), a network such as a near field wireless communication; a content providing device connected via a multimedia interface, or the like. The present embodiment may be connected to two or more of the content providing devices described above.

Second Embodiment

Figure 8:
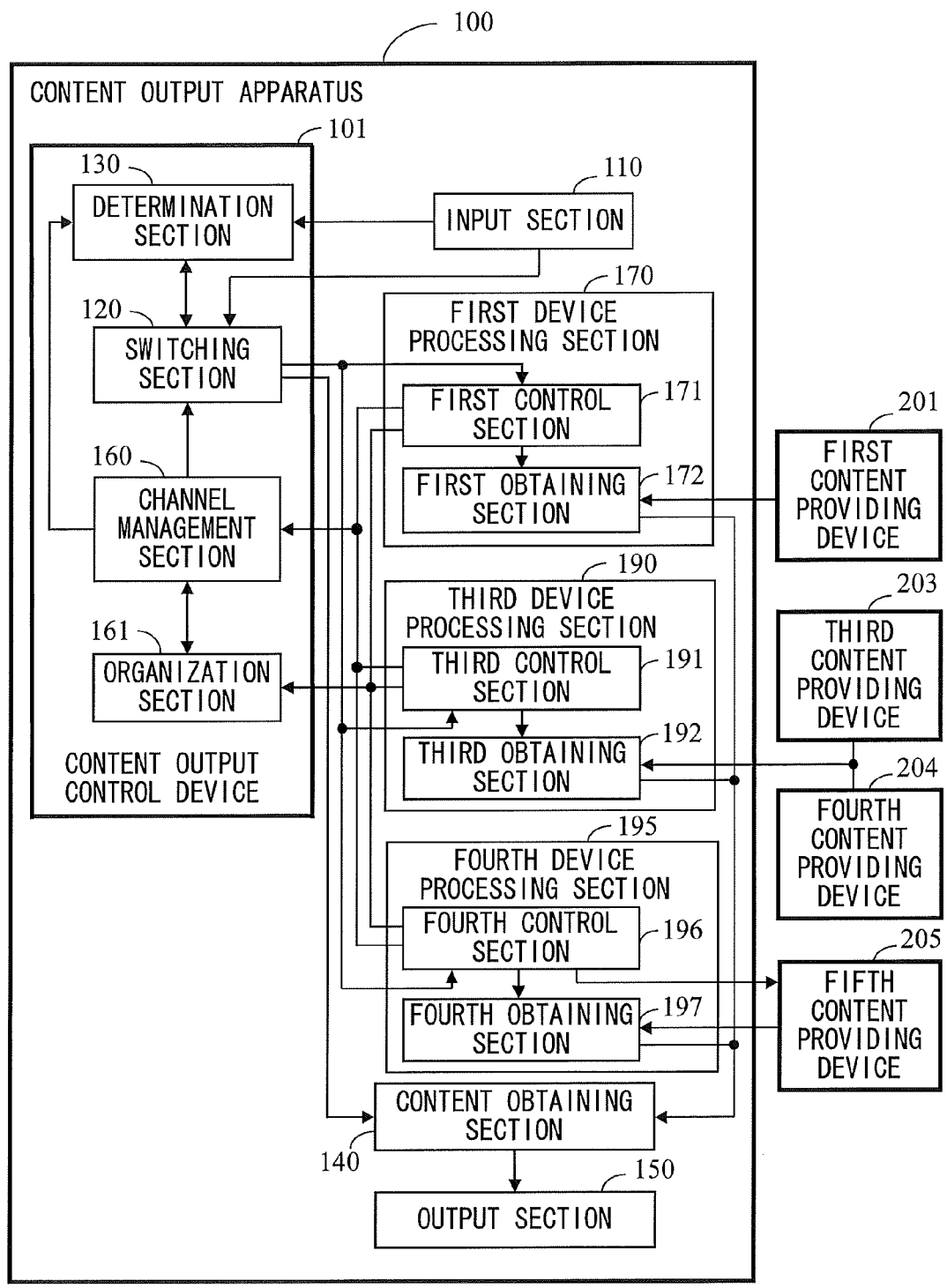
FIG. 8 shows a configuration of a content output apparatus including a content output control device according to a second embodiment of the present invention.

FIG. 8 shows a configuration of a content output apparatus including a content output control device according to a second embodiment of the present invention. As in the same manner as the first embodiment, the first device processing section 170 is assumed to be a television broadcasting tuner. In FIG. 8, the second device processing section 180 and the second content providing device 202 are not shown.

In the following, components the same as those in FIG. 1 are denoted by the same reference numerals as those of FIG. 1 and descriptions thereof are omitted. A third device processing section 190 is a network module. The third device processing section 190 include a third control section 191 and a third obtaining section 192. A fourth device processing section 195 is a file system. The fourth device processing section 195 includes a fourth control section 196 and a fourth obtaining section 197.

The third control section 191 corresponds to a device driver of the network module. The third control section 191 controls power supply to the third device processing section, and controls groups which are regarded as channels, the groups being categorized based on content attribute information. Further, the third control section 191 retains connection destination information such as a URL (Uniform Resource Locator) of each content providing device connectable to the later-described third obtaining section 192, and periodically determines whether the content providing device is connectable. It is noted that the connectable content providing device corresponds to, in an example of FIG. 8, a third content providing device 203 and a fourth content providing device 204. Then, when the content providing device changes from an unconnectable state to a connectable state or vice versa, the channel management section 160 notifies an organization section 161. Further, during a communication with the connectable content providing device, the third control section 191 controls a communication with a network in accordance with a protocol for connecting to the network.

The third obtaining section 192 obtains a content from one of the third content providing device 203 and the fourth content providing device 204, whichever is currently in connection; and converts the content into a content which the content output apparatus 100 can output as necessary.

The third content providing device 203 is a content providing site on the network. The third content providing device 203 receives a request from the content output apparatus 100; provides a content list; and provides a content which the user desires via the network.

The fourth content providing device 204 is a hard disk on the network which the user can control. The fourth content providing device 204 receives a request from the content output apparatus 100; provides a list of contents which can be regarded as a channel; and provides a content which the user desires via the network.

The fourth control section 196 corresponds to a device driver; controls power supply to the fourth device processing section 195; controls contents obtained from a fifth content providing device 205; and controls a list of contents which are regarded as a channel. Further, the fourth control section 196 controls power supply to the fifth content providing device 205. The fourth obtaining section 197 obtains a content from the fifth content providing device 205, and converts the content into a content that the content output apparatus 100 can output as necessary.

The fifth content providing device 205 is a memory card. In the same manner as the second content providing device 202, the fifth content providing device 205 can manage a plurality of groups categorized based on content attribute information, the groups being regarded as channels.

The organization section 161 in the content output control device 101 obtains, in collaboration with the channel management section 160, information of the content providing device associated with each of the device processing sections. It is noted that the device processing sections are the first device processing section 170, the second device processing section 180, the third device processing section 190, and the fourth device processing section 195.

In the following, an operation performed by the content output apparatus 100 which is configured as described above will be described. In an example below, a description is made on the basis of an assumption that the fourth content providing device 204 is not connected to the content output apparatus 100 at the time when the operation of the content output apparatus 100 starts. In this case, the channel management section 160 recognizes the respective device processing sections and manages arrangement of channels which are retained by the content providing devices associated with the respective device processing sections. Here, the device processing sections are the first device processing section 170, the second device processing section 180, the third device processing section 190, and the fourth device processing section 195.

Figure 9:
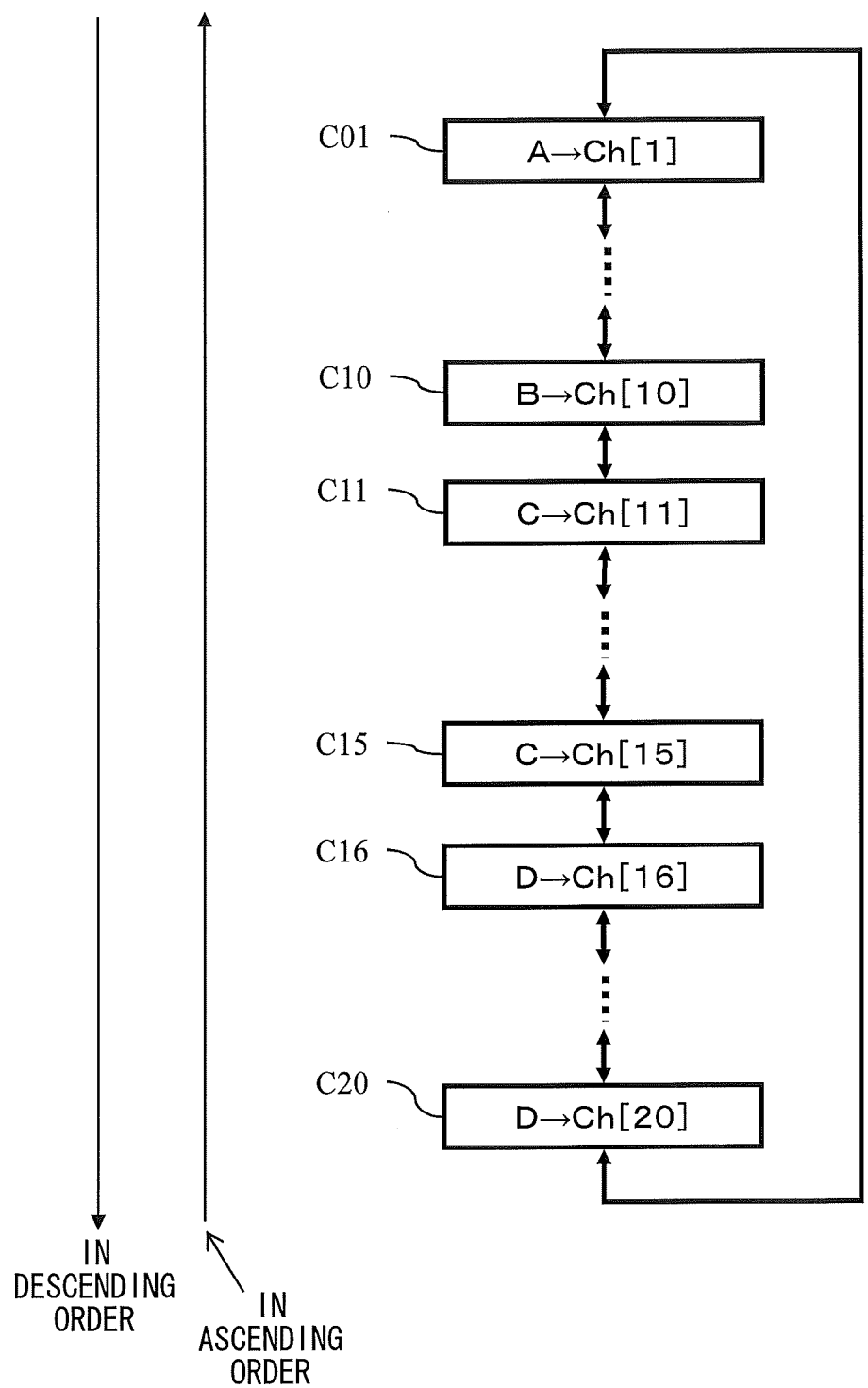
FIG. 9 is a schematic diagram of channel arrangement before a fourth content providing device 204 is connected in the second embodiment of the present invention.

FIG. 9 is a schematic diagram of channel arrangement when the fourth content providing device 204 is not in connection. Here, in addition to notations of FIG. 2, the third content providing device 203 and the fifth content providing device 205 are denoted by "C" and "D," respectively. "C" contains five channels which are Ch[11], Ch[12], Ch[13], Ch[14], and Ch[15] while "D" contains five channels which are Ch[16], Ch[17], Ch[18], Ch[19], and Ch[20].

The channel management section 160 manages arrangements {A, B, C, D} of the content providing devices 201, 202, 203, and 205. Further, the channel management section 160 manages, as channel arrangements, {A→Ch[1], ..., A→Ch[5], B→Ch[6], ..., B→Ch[10], C→Ch[11], ..., C→Ch[15], D→Ch[16], ..., D→Ch[20]}. C01 to C20 in FIG. 9 are reference numerals assigned to the channels, respectively.

Each of the above channels contains therein one or more contents. For example, contents contained in channel Ch[i] (i=1 ... 20) are, in the order of the contents to be outputted to the output section 150, C[i][j](j=1 to N[i] (N[i] is a total number of contents contained in channel Ch[i])). In this case, the channel management section 160 further manages, as content arrangement:
{A→Ch[1]→C[1][1], ..., A→Ch[1]→C[1][N[1]], ..., D→Ch[20]→C[20][1], ..., D→Ch[20]→C[20][N[20]]}.

Thereafter, when the fourth content providing device 204 becomes connectable to the content output apparatus 100, the channel management section 160 adds the fourth content providing device 204 to the arrangement of the content providing devices. Further, the channel management section 160 adds a channel to the channel arrangement on the basis of the content list managed by the fourth content providing device 204. In addition, the channel management section 160 adds the contents managed by the fourth content providing device 204 to the content arrangement.

When the fourth content providing device 204 is in connection, the organization section 161 obtains the arrangement of the content providing devices, the channel arrangement, and the content arrangement managed by the channel management section 160. Further, the organization section 161 obtains information of the control sections of the device processing sections managed by the channel management section 160. The organization section 161 determines that the fourth content providing device 204 having been added performs control in the same manner as the third content providing device 203 by means of the third device processing section, that is, that the fourth content providing device 204 uses the third control section 191 which is the same control section as that used by the third content providing device 203. As a result, the organization section 161 rearranges the arrangement of the content providing devices managed by the channel management section 160 such that the third content providing device 203 and the fourth content providing device 204 are successively arranged. Further, the organization section 161 rearranges the channel arrangement managed by the channel management section 160 such that the channels of the fourth content providing device 204 and channels of the third content providing device 203 are successively arranged. That is, the organization section 161 organizes the channel arrangement such that the channels of the content providing devices which use the same device processing section are arranged in succession. In accordance with the channel arrangement, the organization section 161 organizes the arrangement of the contents contained in the channels.

Figure 10:
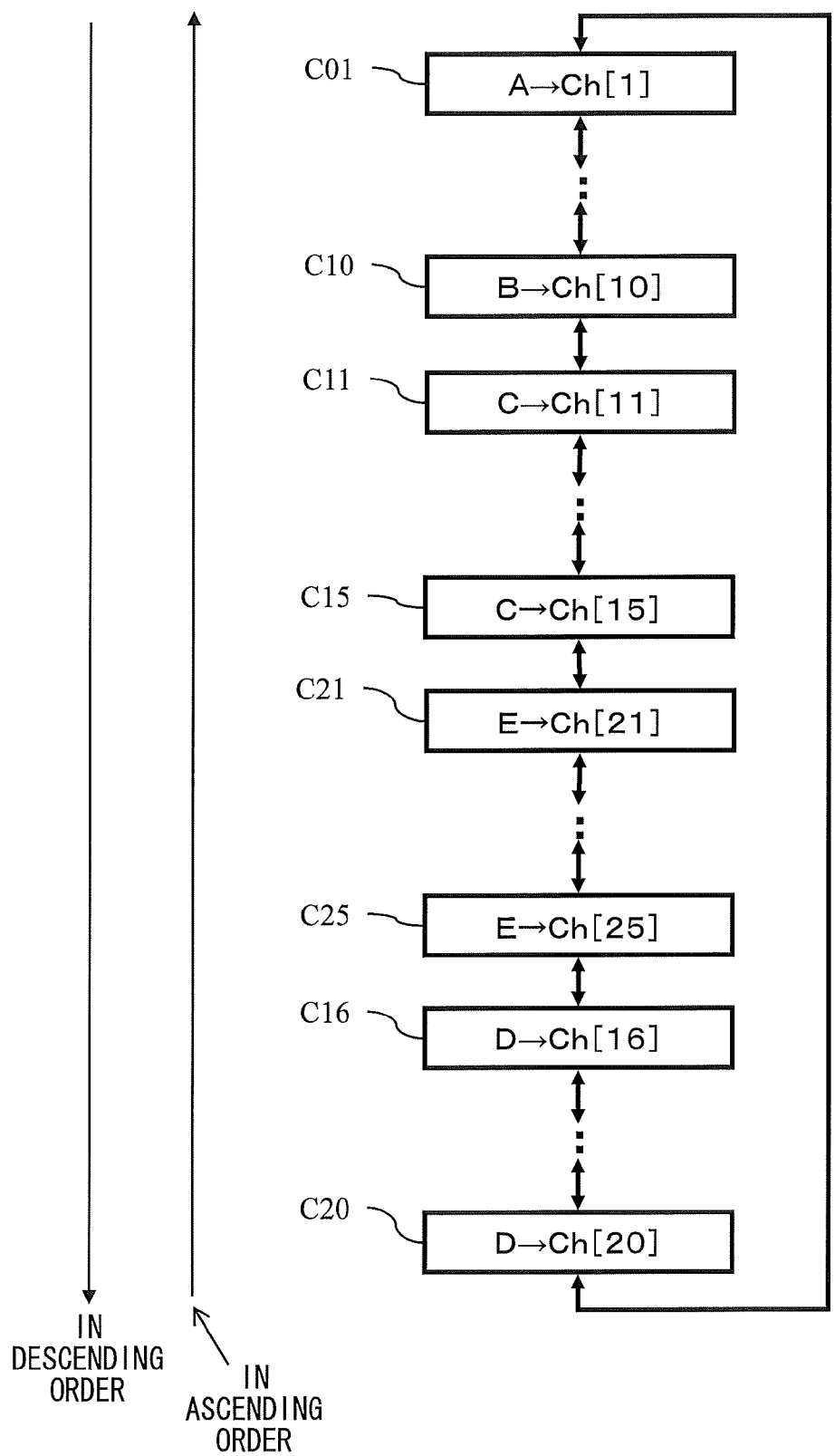
FIG. 10 is a schematic diagram of channel arrangement after the fourth content providing device 204 is connected in the second embodiment of the present invention.

FIG. 10 is a schematic diagram of channel arrangement when the fourth content providing device 204 is in connection. Here, the fourth content providing device 204 is denoted by "E", and "E" contains five channels which are Ch[21], Ch[22], Ch[23], Ch[24], and Ch[25].

The organization section 161 organizes the arrangement of the content providing devices such that "C" is followed by "E". Accordingly, the arrangement of the content providing devices is {A, B, C, E, D}. Further, the organization section 161 organizes the channel arrangement such that a final channel of "C" is followed by channels of "E." Accordingly, the channel arrangement is {A→Ch[1], ..., A→Ch[5], B→Ch[6], ..., B→Ch[10], C→Ch[11], ..., C→Ch[15], E→Ch[21], ..., E→Ch[25], D→Ch[16], ..., D→Ch[20]}. C01 to C25 in FIG. 10 are reference numerals assigned to the channels, respectively.

The organization section 161 organizes the content arrangement such that a final content of "C" is followed by the contents of "E." Accordingly, the content arrangement which is represented on the basis of the above notations is as follows: {A→Ch[1]→C[1][1], ..., A→Ch[1]→C[1][N[1]], ..., C→Ch[15]→C[15][1], ..., C→Ch[15]→C[15][N[15]], E→Ch[21]→C[21][1], ..., E→Ch[21]→C[21][N[21]], ..., E→Ch[25]→C[25][1], ..., E→Ch[25]→C[25][N[25]], D→Ch[16]→C[16][1], . . . , D→Ch[16]→C[16][N[16]], ..., D→Ch[20]÷C[20][1], ..., D→Ch[20]→C[20][N[20]]}.

As described above, in the second embodiment, when a content providing device is newly added, the organization section 161 arranges channels of the content providing device which is added so as to follow channels of other content providing devices which use the common device processing section. As a result, in the present embodiment, the number of times of device switching processes can be reduced. Accordingly, the number of times of starting up the device processing sections is reduced, thereby enabling further power saving of the content output apparatus.

It is noted that, in the second embodiment, the description has been made by using an example in which the hard disk is connected so as to be used by the user on the network; however, there are many situations where the number of content providing devices increases or decreases while the content output apparatus is active. The situations where the number of content providing devices increases or decreases are situations where, for example, a connection status of the network changes; a storage media or a cable is inserted or removed; a content providing device compatible with Plug and Play is connected or disconnected; and a content providing device connected via a UPnP (Universal Plug and Play) is connected or disconnected. In these situations, the operation of the organization section performed when a content providing device is added is the same. Accordingly, a form and a connection method of a content providing device are not limited to the examples of the present embodiment.

Further, when the content providing devices use obtaining sections of different device processing sections and use a common control section, the organization section may organize channel arrangement such that channels of the content providing devices which use the common control section are arranged in succession. That is, even if the device processing sections are different, in view of the control of power supply, the organization section may organize the channels of the different content providing devices which use the common control section the same as those of the common device processing section.

In the first and the second embodiments, when the user views channels while performing zapping, the determination section 130 predicts a start-up timing of a device processing section connected to another content providing device, and the switching section 120 starts up the device processing section. However, the determination section 130 can predict the start-up timing at times other than when the user views channels while performing zapping. For example, on the basis of an end time which is a time of break between contents contained in a channel currently viewed by the user by referring to an electronic program guide, the determination section 130 may determine a start-up timing to be a time that is a time period corresponding to a time taken for starting up a device processing section prior to the end time. It is noted that the end time which is the break between the contents may be specified on the basis of an end time of a video content, an end time of a chapter, or an end time of a broadcast program. Further, when the control section of the device processing section can control power supply to the content providing device, the determination section 130 may cause the control section of the device processing section to start up the content providing device at the following start-up timing to be indicated by the switching section 120 next. Here, the start-up timing may be, for example, a time that is a time period corresponding to one of a time taken for starting up the device processing section and a time taken for starting up the content providing device, whichever is longer before; or a time that is a time period corresponding to a total of the time taken for starting up the device processing section and the time taken for starting up the content providing device before.

INDUSTRIAL APPLICABILITY

The content output control device according to the present invention is useful for controlling a television receiver on which contents of a plurality of content providing devices are viewed while zapping is performed. In addition, the content output control device according to the present invention is also applicable to a mobile phone, a personal computer, a music player, a car navigation system, and the like.

DESCRIPTION OF THE REFERENCE CHARACTERS 100 content output apparatus
101 content output control device
110 input section
120 switching section
130 determination section
140 content obtaining section
150 output section
160 channel management section 161 organization section
170, 180, 190, 195 device processing section
171, 181, 191, 196 control section
172, 182, 192, 197 obtaining section
201 to 205 content providing device
C01 to C25 channel Ch[1] to Ch[25]
I01 to I05 operation input

The invention claimed is:

1. A content output control device for controlling a content output apparatus which obtains, from a plurality of content providing devices some of which are available via a network, contents through device processing sections compatible with the respective content providing devices; and outputs the obtained contents, the content output control device comprising:
   a switching section for, when a channel switching operation is inputted by a user, switching between channels on the basis of the channel switching operation and determining whether a zapping operation is currently performed;
   a channel management section for managing, as channel arrangement, arrangement time in which channels provided by the plurality of the content providing devices are arranged in order of switching by the channel switching operation; and
   a determination section for, when the switching section determines that the zapping operation is currently performed, calculating, on the basis of the channel arrangement, an estimated time period until a channel for displaying a content being currently viewed is switched to an initial channel of a different content providing device from a content providing device providing the content being currently viewed; and determining that a start-up timing has come when the estimated time period falls below a predetermined value, wherein
   the switching section, when the determination section determines that the start-up timing has come, starts up a device processing section connected to the different content providing device.

2. The content output control device according to claim 1, wherein in a case where the device processing section can control power supply to the content providing devices, when the determination section determines that the start-up timing has come, the device processing section connected to the different content providing device is caused to start up the different content providing device.

3. The content output control device according to claim 1, wherein each of the channels is a group of contents to which an order of output is preassigned.

4. The content output control device according to claim 1, further comprising an organization section for, when a new content providing device is connected to the content output apparatus, if a content providing device being in connection performs control in the same manner as the new content providing device, rearranging the channel arrangement such that channels of the new content providing device are arranged adjacent to channels of the content providing device being in connection.

5. The content output control device according to claim 1, wherein the determination section retains a starting-up time from a time when a device processing section connected to the plurality of the content providing devices is powered on to a time when contents of the plurality of the content providing devices become available; and determines the predetermined value to be the starting-up time.

6. The content output control device according to claim 2, wherein the determination section retains a first starting-up time from a time when a device processing section connected to the plurality of the content providing devices is powered on to a time when the plurality of the content providing devices become accessible and a second starting-up time from a time when the plurality of the content providing devices are powered on to a time when contents of the plurality of the content providing devices become available; and determines, when a process of starting up the device processing section is performed in parallel with a process of starting up the content providing devices, one of the first starting-up time and the second starting-up time, whichever is longer, to be the predetermined value.

7. The content output control device according to claim 2, wherein the determination section retains a first starting-up time from a time when a device processing section connected to the plurality of the content providing devices is powered on to a time when the plurality of the content providing devices become accessible and a second starting-up time from a time when the plurality of the content providing devices are powered on to a time when contents of the plurality of the content providing devices become available; and determines a sum of the first starting-up time and the second starting-up time to be the predetermined value, when a process of starting up the content providing devices can be performed after performing a process of starting up the device processing section.

8. The content output control device according to claim 1, wherein the determination section calculates the estimated time period based on: the number of channels from a channel being currently viewed to the initial channel of the different content providing device; or both of the number of the channels and a time taken for switching from one channel to another in the channel switching operation.

9. The content output control device according to claim 1, wherein the switching section, when the device processing section connected to the different content providing device is started up as a result of a switching process performed by the switching section, measures a time elapsed from a time when use of a content providing device before the switching process is terminated; and, when the elapsed time exceeds a predetermined threshold, terminates power supply to a device processing section connected to the content providing device before the switching process.

10. The content output control device according to claim 2, wherein the switching section, when the device processing section connected to the different content providing device is started up as a result of a switching process performed by the switching section, measures an elapsed time from a time when use of a content providing device before the switching process is terminated; and, when the elapsed time exceeds a predetermined threshold, causes a device processing section connected to the content providing device before the switching process to terminate power supply to the content providing device before the switching process.

11. A content output control method for controlling a content output apparatus which obtains, from a plurality of content providing devices some of which are available via a network, contents through device processing sections compatible with the respective content providing devices; and outputs the obtained contents, the content output control method comprising:
   a switching step of, when a channel switching operation is inputted by a user, switching between channels on the basis of the channel switching operation and determining whether a zapping operation is currently performed;
   a determining step of, when it is determined that the zapping operation is currently performed in the switching step, calculating, on the basis of channel arrangement in which channels provided by the plurality of the content providing devices are arranged in order of switching by the channel switching operation, an estimated time period until a channel for displaying a content being currently viewed is switched to an initial channel of a different content providing device from a content providing device providing the content being currently viewed; and determining that a start-up timing has come when the estimated time period falls below a predetermined value; and a starting up step of, when it is determined that the start-up timing has come in the determining step, starting up a device processing section connected to the different content providing device.

* * * * *